M. OSNOS.
METHOD OF TUNING ALTERNATING CURRENT CIRCUITS.
APPLICATION FILED JUNE 6, 1913.
1,122,027.
Patented Dec. 22, 1914.
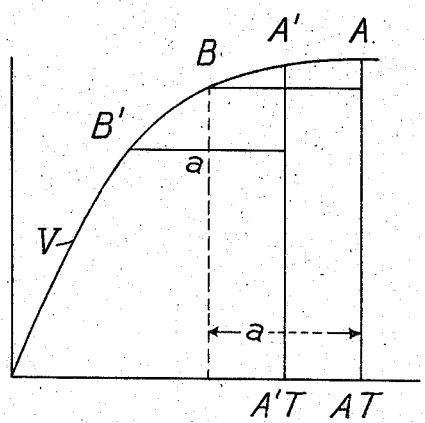
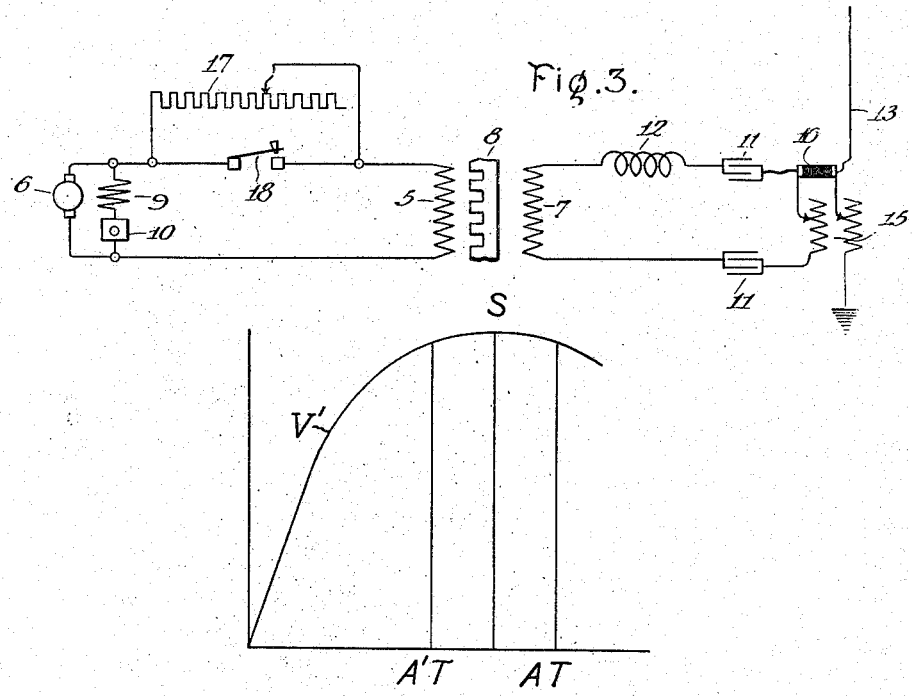
WITNESSES
INVENTOR
MENDEL OSNOS
BY
HIS ATTORNEY

UNITED STATES PATENT OFFICE.

MENDEL OSNOS, OF BERLIN, GERMANY, ASSIGNOR TO GENERAL ELECTRIC COMPANY, A CORPORATION OF NEW YORK.

METHOD OF TUNING ALTERNATING-CURRENT CIRCUITS.

1,122,027.  Specification of Letters Patent.  Patented Dec. 22, 1914.

Application filed June 6, 1913. Serial No. 772,102.

*To all whom it may concern:*

Be it known that I, MENDEL OSNOS, a subject of the Emperor of Russia, residing at Berlin, Germany, have invented certain new and useful Improvements in Methods of Tuning Alternating-Current Circuits, of which the following is a specification.

My invention relates to the tuning of alternating current circuits, and in particular to the tuning of high frequency alternating current circuits.

The object of my invention is to provide a novel method of tuning alternating current circuits, and particularly of tuning such circuits for currents of high frequency.

Heretofore alternating current circuits have been tuned by the use of inductance coils of variable sizes and condensers of adjustable capacity. I propose to eliminate, in whole or in part, the inductance coils, and in certain instances the condensers, heretofore employed for tuning, and to secure the proper inductance in the electric circuit by regulating the magnetic condition of the electrical apparatus included in the circuit.

To this end my invention consists in making the magnetic condition of certain apparatus included in the alternating current circuit adjustable, and in adjusting the magnetic condition of this apparatus until the self induction of the apparatus gives to the circuit a total inductance of the desired quantity.

The novel features which I believe to be patentably characteristic of my invention are definitely indicated in the claims appended hereto.

The principle and the mode of operation of my invention will be understood from the following discussion taken in connection with the accompanying drawings, in which:—

Figures 1 and 2 are graphic illustrations of the principle of operation of my invention.

The curve V of Fig. 1 of the drawings illustrates the no load voltage curve of an alternator in terms of the exciting ampere turns. The ordinates of the curve accordingly indicate volts and the abscissæ indicate exciting ampere turns. Assuming that the exciting ampere turns are equal to AT, we find that the corresponding no load voltage is represented by A. If the reactive or inductive ampere turns of the normal load current are equal to $a$, then the normal load voltage is equal to B. This normal load voltage is obtained by subtracting the reactive ampere turns at normal load from the exciting ampere turns at no load. The self induction of the machine in ohms is, therefore, found by the following equation:—

$$L = \frac{Z(A-B)}{a}$$

where L is the self induction of the machine and Z is the number of turns of winding that is traversed by the reactive current.

If we assume the exciting ampere turns to be reduced until they are equal to A'T, the corresponding no load voltage will be found to be A', and the normal load voltage B'. The corresponding self induction L' of the machine is then found by the following equation:—

$$L' = \frac{Z(A'-B')}{a}$$

From an examination of Fig. 1, it will be observed that L' is very considerably greater than L, about three times as great in the case of the example illustrated. By the gradual regulation of the exciting ampere turns from AT to AT', it is, therefore, possible to vary quite gradually the magnitude of the self induction of the alternator, and consequently the total inductance of the electric circuit, in which the alternator is included. In the example given, the self induction of the machine can be varied in the ratio of about 1:3, and in general a still greater adjustment can be obtained.

My invention is of special advantage where high frequency alternators of the inductor type are included in the electric circuit. The no load voltage curve of an alternator of the inductor type is quite symmetrical on each side of the point of maximum voltage. The voltage curve of such a machine is illustrated in Fig. 2 of the drawings. If AT and AT' are taken on each side of the apex S, or point of maximum voltage, of the voltage curve V', then the self induction of the machine may be varied quite considerably with slight corresponding voltage variation.

In the application of my invention to machines with laminated rotors, for example, machines of the type shown in the German patent to Guy, No. 143,630, a further advantage is afforded, as tests have shown, in that the iron losses do not vary with the increase of the ampere turns from AT' to AT, since these losses are substantially dependent only upon the voltage.

The adjustment of the exciting ampere turns of the alternator may be obtained in two ways. First by regulating the magnitude of the exciting direct current or by varying the number of actual turns of the exciting winding. The adjustment by regulation of the exciting direct current is, however, preferable on account of its simplicity and greater fineness and accuracy of adjustment.

Under certain conditions it may be found undesirable to vary the magnetic saturation conditions of the alternator, or the maximum variation permitted may not be sufficient to produce the desired quantity of inductance in the circuit. In either of these cases, the magnetic saturation condition of a transformer included in the alternating current circuit may be varied with a precisely similar effect in its self induction as hereinbefore described in connection with the alternator. The saturation condition of the transformer may be varied by cutting out a proportional number of turns on both sides of the transformer, that is, on the primary as well as the secondary winding, whereby the ratio of transformation of the transformer is not affected. The transformer being included in the alternating current circuit, a change in its self induction effects a corresponding change in the total inductance of the circuit. The adjustment of the magnetic saturation condition of the transformer is often of decided advantage because the mere change of the magnetic condition of a high frequency alternator does, under some circumstances, necessitate a great many direct current exciting ampere turns which are not always easy to apply, as for example, if the voltage curve is a very flat one.

An example of the embodiment of my invention in a system of wireless signaling is diagrammatically illustrated in Fig. 3 of the accompanying drawings. I have in this figure shown my invention in connection with a high frequency alternator of the inductor type having a stationary field or exciting winding 5 connected to a suitable source of exciting current, such as a direct current generator 6, and having a stationary armature winding 7 and a rotatable inductor 8. The exciter generator 6 has a field winding 9 and a controlling rheostat 10 of the usual construction. The armature winding 7 of the high frequency alternator is connected in the oscillation circuit of a wireless signaling system. This circuit includes condensers 11 and an inductance 12, and is inductively connected to a grounded antenna 13 through a transformer 15. In accordance with my present invention the saturation condition, and hence the inductance of the transformer 15, may be varied by adjusting a correspondingly proportional number of primary and secondary turns by means of an adjusting switch 16. The saturation condition of the alternator may also be varied by means of an adjustable resistance 17 included in the circuit of the field winding 5. Adjustment of the resistance 17 varies the direct current supplied to the field winding 5 and, as heretofore explained, varies the saturation condition of the alternator. A key 18 is employed for sending signals. When the key is raised the saturation condition of the alternator is so adjusted by the amount of the resistance 17 included in the field circuit that the oscillation circuit is properly tuned, and relatively strong impulses are radiated from the antenna. When the key 18 is lowered and the adjustable resistance 17 shunted, the saturation condition of the alternator is so changed that the oscillation circuit is no longer tuned, and the impulses sent out from the antenna are relatively feeble.

It will be apparent from the foregoing discussion that I have provided a method of tuning an alternating current circuit by adjusting the magnetic condition of electrical apparatus having magnetic characteristics included in the circuit.

While I have described my invention with particular reference to the adjustment of the magnetic saturation condition of an alternator or a transformer included in the circuit, it will be evident that the invention is not limited to these particular kinds of apparatus, but is applicable to any electrical apparatus having magnetic characteristics and included in the electric circuit. The inductance coils which have heretofore been used for tuning purposes may be entirely eliminated by obtaining the proper quantity of inductance in the circuit in accordance with my invention. In some cases, however, it may be found desirable to replace the tuning inductance coils only in part. In certain cases it has also been found possible to dispense with the usual tuning condensers in whole or in part, as for example, where the capacity of the circuit itself and the apparatus included therein is sufficient and the only requirement for resonance is to include in the circuit the proper amount of inductance.

My novel method of tuning alternating current circuits may be carried out in various other modes than those mentioned herein. I do not, therefore, desire to be limited to the specific methods described, but aim in the appended claims to cover all methods of tuning alternating current circuits embodying the principle and within the scope of my invention.

What I claim as new and desire to secure by Letters Patent of the United States, is:—

1. The method of tuning an alternating current circuit including an alternating current dynamo-electric machine having magnetic characteristics which consists in varying the magnetic saturation condition of said machine until the self induction of the machine gives to the circuit a total inductance of the desired quantity.

2. The method of tuning an alternating current circuit including an alternator which consists in varying the magnetic saturation condition of said alternator until the self induction of the alternator gives to the circuit a total inductance of the desired quantity.

3. The method of tuning an alternating current circuit including an alternator which consists in varying the exciting ampere turns of said alternator until the self induction of the alternator gives to the circuit a total inductance of the desired quantity.

4. The method of tuning an alternating current circuit including an alternator which consists in producing the exciting magnetic field of said alternator by means of direct current, and varying the magnitude of said direct current until the self induction of the alternator gives to the circuit a total inductance of the desired quantity.

5. The method of tuning an alternating current circuit including a high frequency alternator of the inductor type which consists in varying the magnetic saturation condition of said alternator until the self induction of the alternator gives to the circuit a total inductance of the desired quantity.

6. The method of tuning an alternating current circuit including a high frequency alternator of the inductor type which consists in varying the exciting ampere turns of said alternator until the self induction of the alternator gives to the circuit a total inductance of the desired quantity.

7. The method of tuning an alternating current circuit including an alternator and a transformer which consists in varying the magnetic saturation conditions of the alternator and of the transformer until the self induction of the alternator and of the transformer gives to the circuit a total inductance of the desired quantity.

8. The method of tuning and alternating current circuit including an alternator and a transformer which consists in varying the magnetic saturation condition of the alternator by altering the direct current excitation and varying the magnetic saturation condition of the transformer until the self induction of the alternator and the self induction of the transformer give to the circuit a total inductance of the desired quantity.

In witness whereof, I have hereunto set my hand this 26 day of May, 1913.

MENDEL OSNOS.

Witnesses:
RICHARD VENMANN,
GUSTAV WERNER.